UNITED STATES PATENT OFFICE.

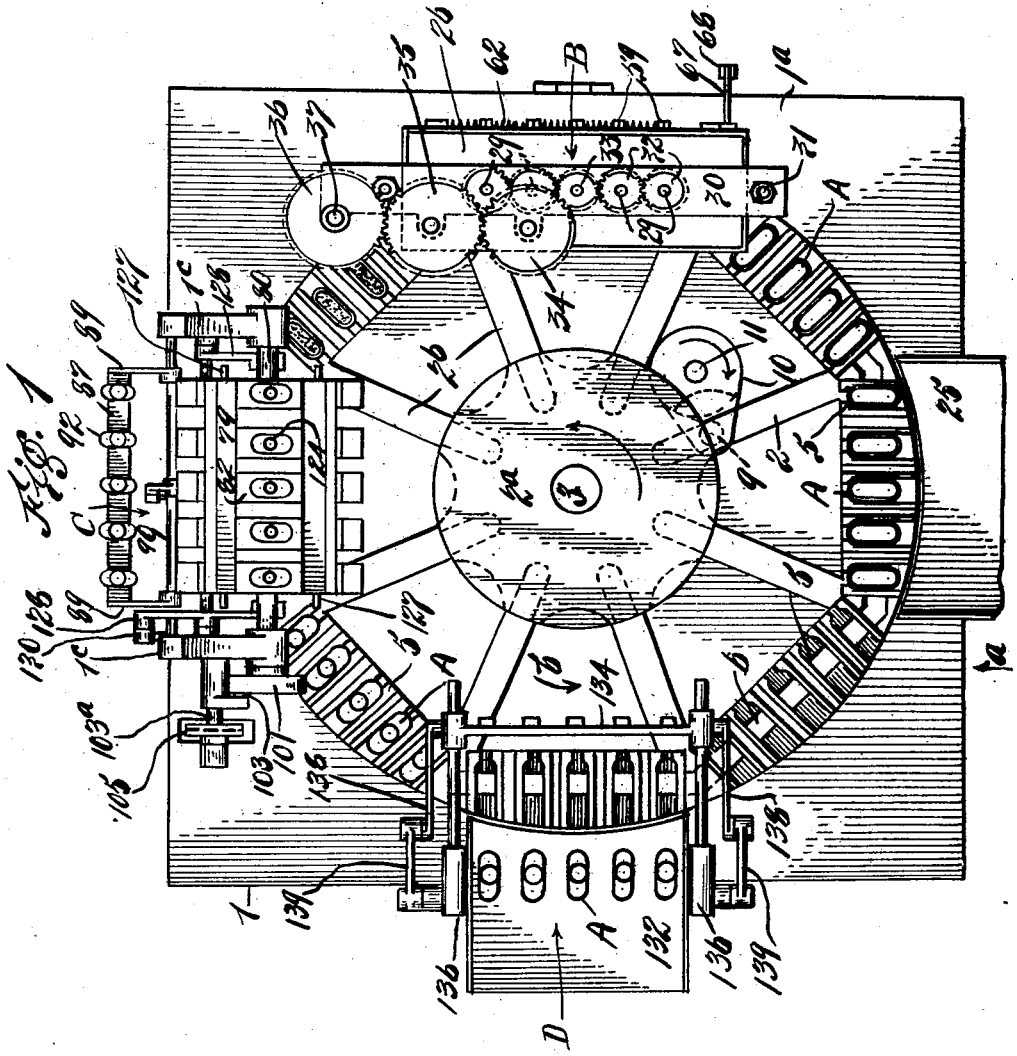

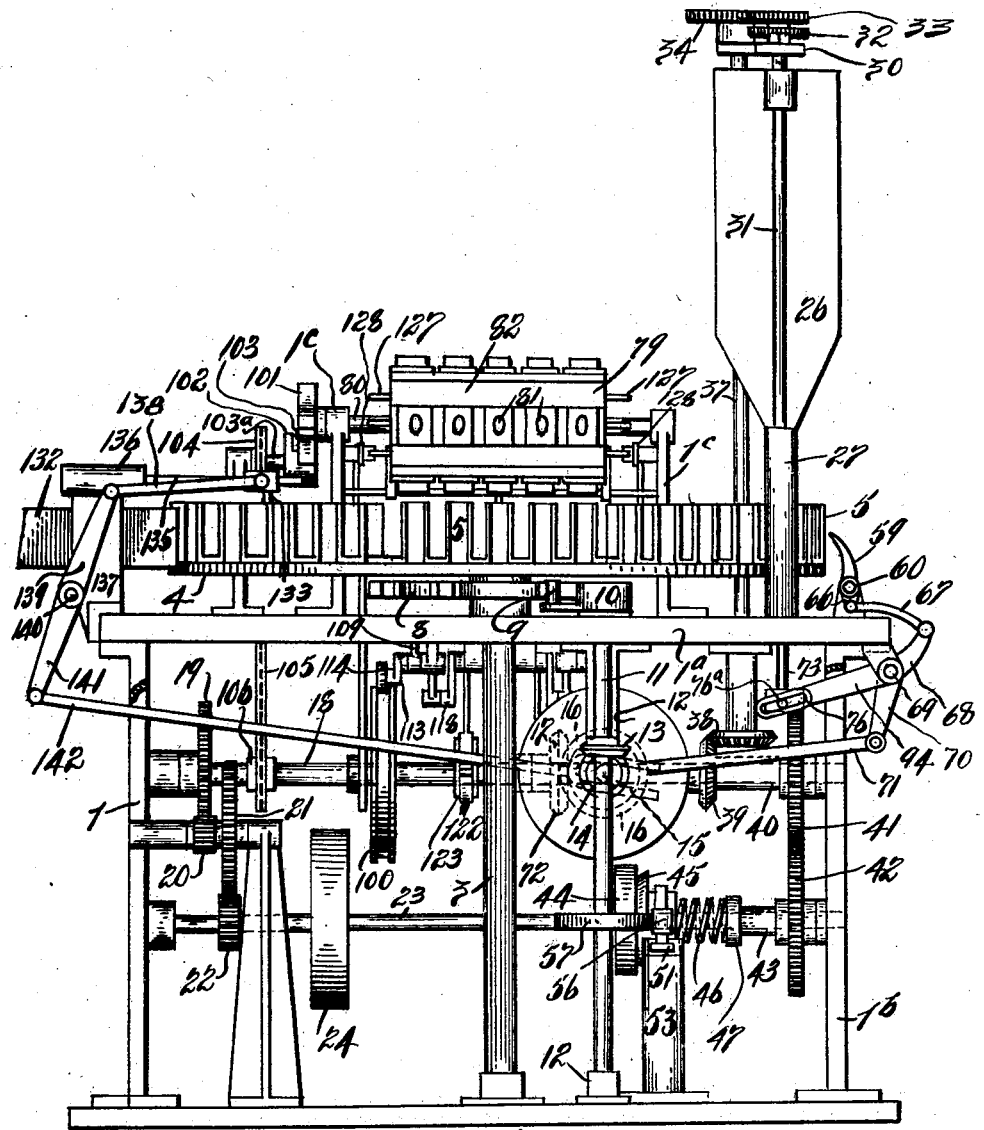

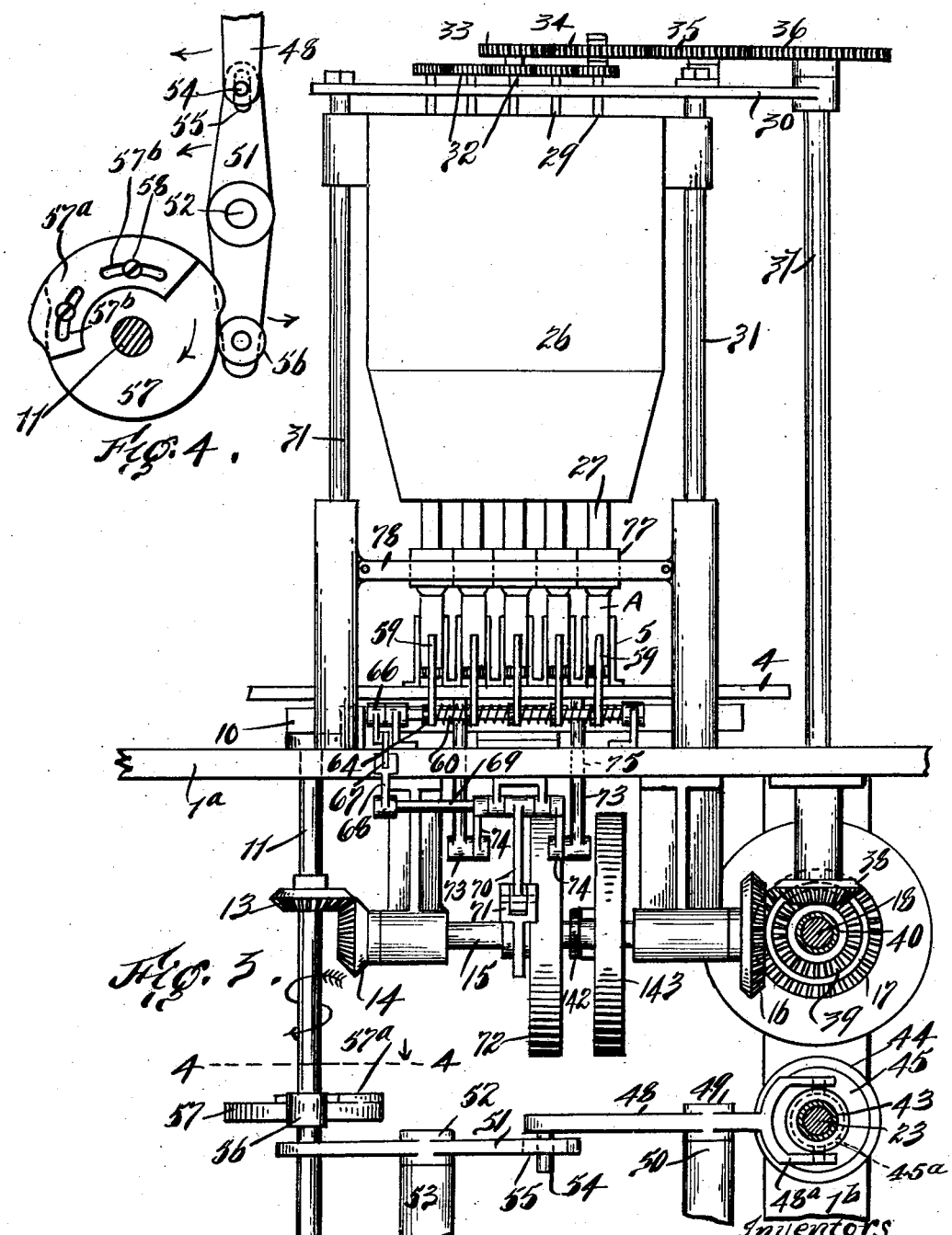

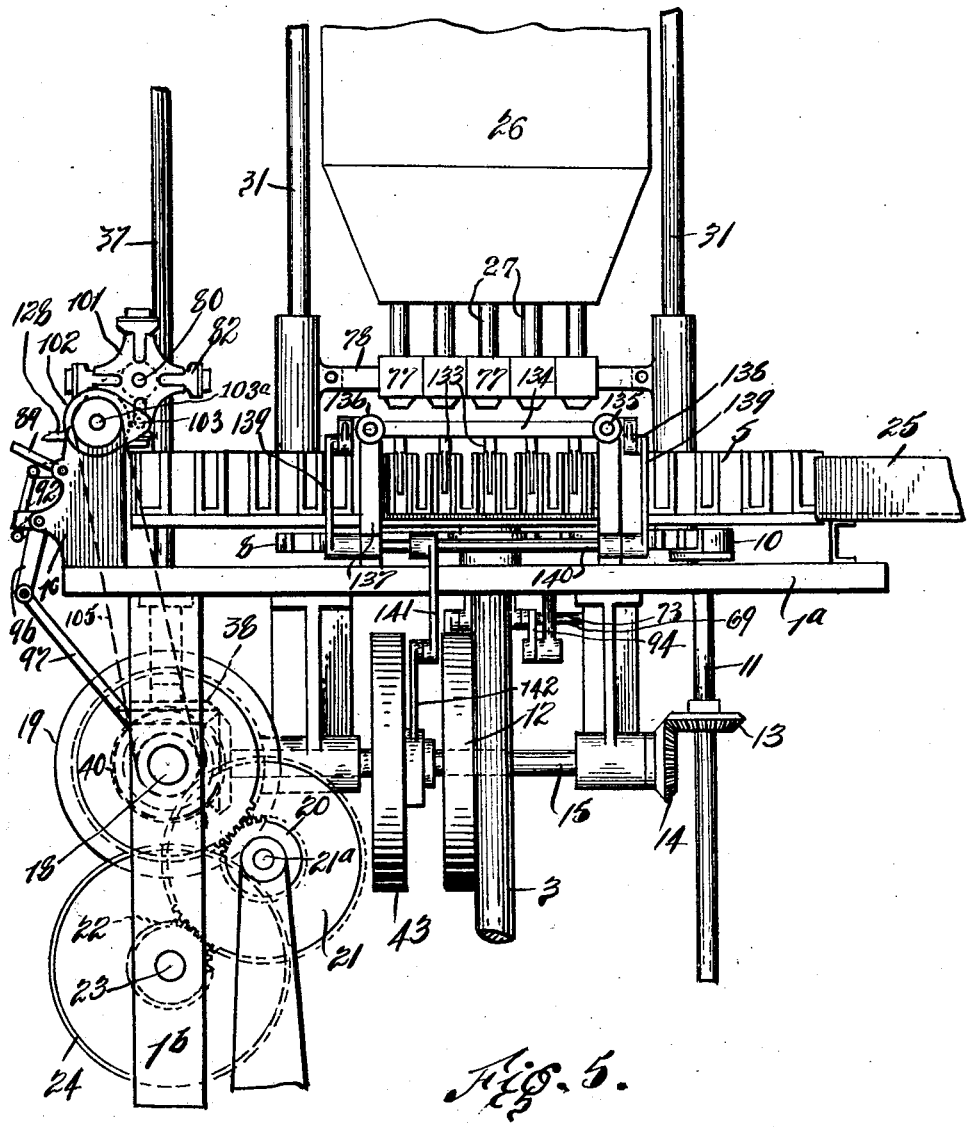

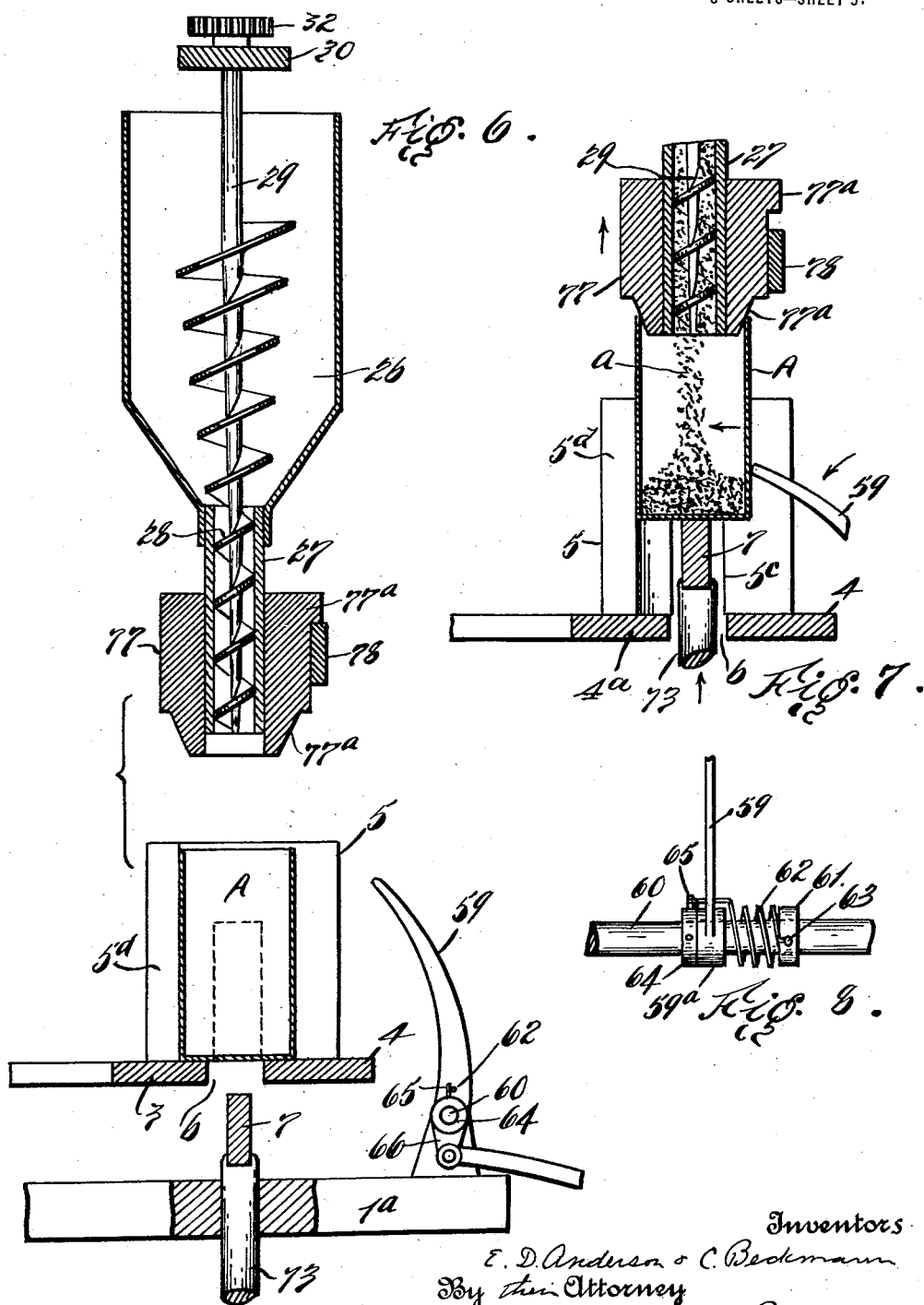

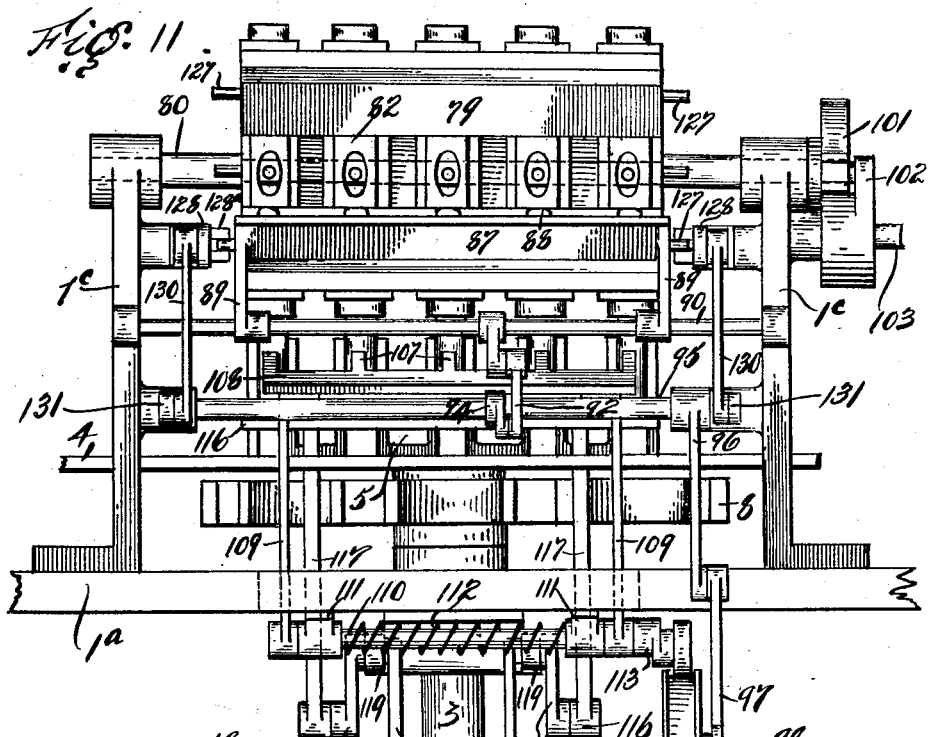

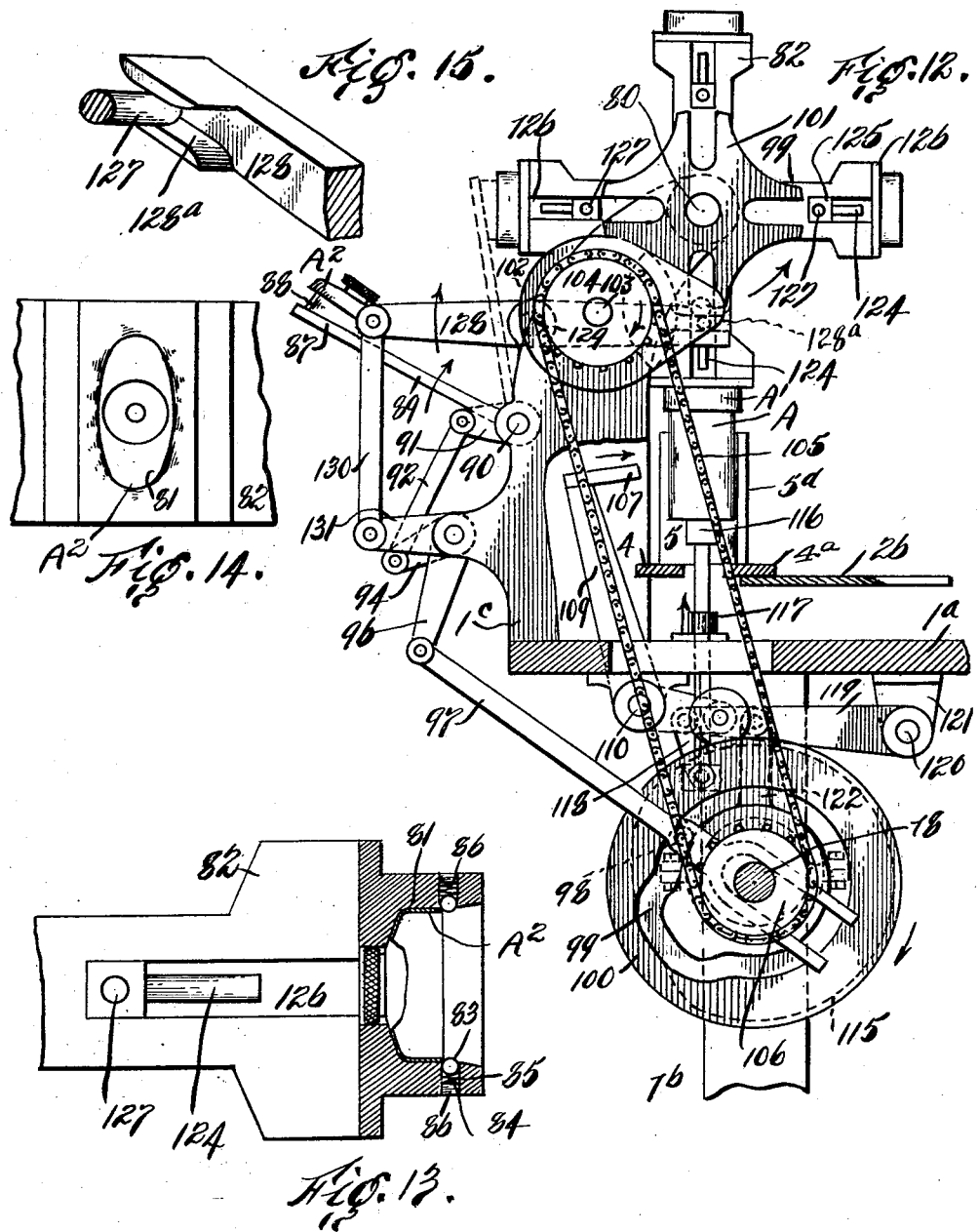

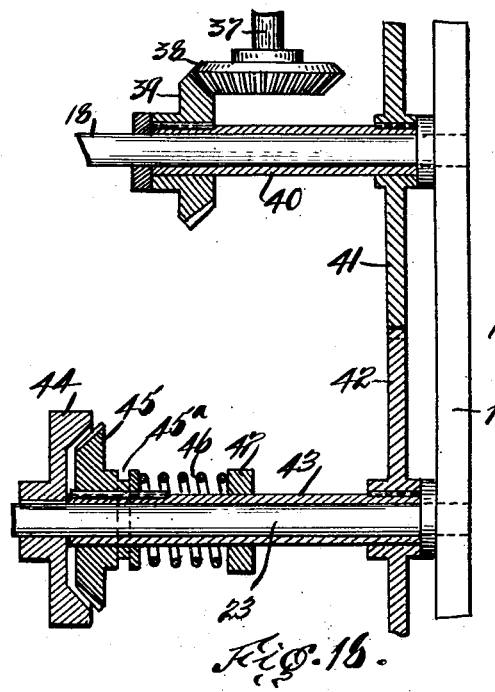
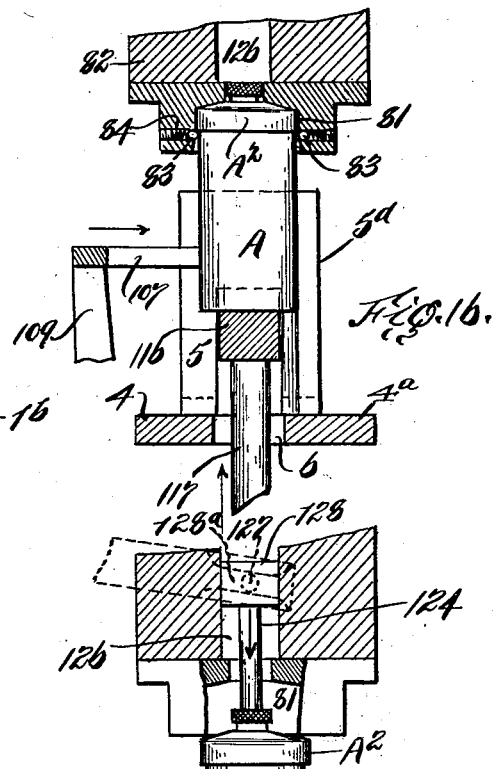
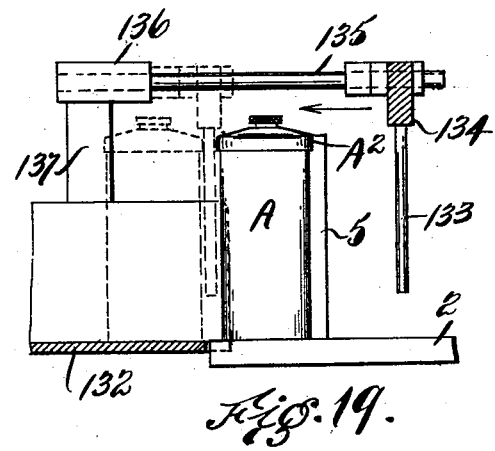
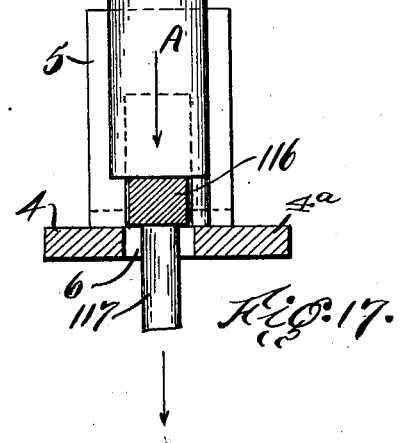

ERNEST D. ANDERSON AND CARL BECKMANN, OF NEW YORK, N. Y., ASSIGNORS TO E. D. ANDERSON, INC., OF NEW YORK, N. Y., A CORPORATION OF NEW YORK.

PACKAGING MACHINE.

1,409,211.  Specification of Letters Patent.  Patented Mar. 14, 1922.

Application filed February 27, 1920. Serial No. 361,671.

*To all whom it may concern:*

Be it known that we, ERNEST D. ANDERSON, a citizen of the United States, and resident of New York city, borough of Manhattan, county and State of New York, and CARL BECKMANN, a subject of Germany, and resident of New York city, borough of Queens, and State of New York, have invented certain new and useful Improvements in Packaging Machines, of which the following is a specification.

The object of this invention is to charge receptacles with goods, apply covers or tops upon the receptacles, and discharge the completed receptacles in an expeditious and economical manner.

In the embodiment of the invention illustrated in the accompanying drawings the machine comprises a rotative turret having receivers for the receptacles, means to rotate the turret step by step, devices to insert in the receptacles required charges of goods, devices to apply covers or tops upon the charged receptacles by movement of the receptacles and covers relatively to one another, and means to discharge the finished receptacles.

The invention further comprises novel details of improvement and combinations of parts that will be more fully hereinafter set forth and then pointed out in the claims.

Reference is had to the accompanying drawings forming part hereof wherein—

Figure 1, is a plan view of a machine embodying this invention;

Fig. 2 is a side elevation looking in the direction of the arrow *a* in Fig. 1;

Fig. 3 is an enlarged side view looking from the right hand side of Fig. 2, parts being omitted;

Fig. 4 is an enlarged detail plan view partly in section on the line 4—4 in Fig. 3;

Fig. 5 is a side view looking from the left hand side of Fig. 2, parts being omitted;

Fig. 6 is an enlarged detail sectional view illustrating means for charging the receptacles;

Fig. 7 is a view of a portion of Fig. 6 illustrating a step in charging the receptacles;

Fig. 8 is a detail of parts shown in Fig. 6 for seating the receptacles in their receivers;

Fig. 9 is an enlarged perspective view illustrating part of the turret and one of the receivers for the receptacles;

Fig. 10 is a perspective view of a cover or top for the receptacles;

Fig. 11 is an enlarged detail side view illustrating the cover applying devices, looking from the left hand side of Fig. 5;

Fig. 12 is a partly sectional detail side view enlarged looking from the right hand side of Fig. 11;

Fig. 13 is a sectional detail of part of the head having a recess for the cover to be applied on the receptacle;

Fig. 14 is an end view looking from the right hand side of Fig. 13;

Fig. 15 is a detail perspective view of means for operating the ejector for the cover illustrated in Fig. 13;

Figs. 16 and 17 are sectional details illustrating steps in assembling and discharging the receptacle and its cover;

Fig. 18 is a detail section of driving gears, and

Fig. 19 is a detail view illustrating discharging devices for the finished receptacles.

Similar numerals of reference indicate corresponding parts in the several views.

The main frame of the machine is indicated generally at 1 and it may be of any suitable construction, the same being shown provided with a table or plate $1^a$ and legs $1^b$. At 2 is a support for receptacles A shown in the form of a rotative turret carried by a rod or shaft 3 above the table top $1^a$. Said turret is shown comprising a central member $2^a$ having radiating arms $2^b$ that carry at their outer ends a rim $4^a$ spaced from an outer rim 4. The rims 4, $4^a$ are secured together by receivers 5 shown comprising spaced members $5^a$, $5^b$, (Fig. 9) that are secured to the rims 4, $4^a$ to receive the receptacles A therebetween. The members $5^a$, $5^b$ support rim 4 from rim $4^a$ and maintain said rims spaced to provide an annularly disposed space 6 therebetween. The members $5^a$, $5^b$ at their mid portions are recessed at $5^c$, such recesses and the interior of the recesses communicating with space 6. The construction is such that receptacle raising members 7 may operate in the space 6 and in the recesses $5^c$ and the receivers to raise the receptacles, (Figs. 6 and 7). The receivers 5 are open at their outer edges to admit receptacles A and are open at their tops to permit said receptacles to be raised to receive charges of material in the receptacles. The inner vertical edges 5ᵈ of the receiver members 5ᵃ, 5ᵇ approach each other, (Fig. 9) to provide rear walls within the receivers against which the receptacles may be pressed to center the receptacles for filling and capping operations, the edges 5ᵈ of the receivers being spaced apart to admit ejectors hereinafter described. Several series of five receivers each are located along corresponding rectangular portions of space 6, which is continuous around the marginal portions of the turret, so that the straight bar 7 may be caused to rise through each of the straight portions of space 6 as required for raising and lowering the several receptacles in each such series of receivers. The turret is adapted to be rotated step by step in the direction of the arrow $b$ in Fig. 1. For such purpose the turret is provided with a member 8 of a Geneva movement that is secured to the turret, the slots of the member 8 being adapted to receive a projection 9 from an arm 10 of the Geneva movement shown carried by shaft 11 journalled in bearings 12 upon the main frame, (Figs 1, 2, 3 and 5), whereby each time the arm 10 is rotated said projection will co-act with Geneva member 8 to rotate the turret one step. Shaft 11 is shown provided with a gear 13 in mesh with gear 14 on shaft 15 journalled in bearings on the main frame. Shaft 15 has a gear 16 in mesh with gear 17 secured on shaft 18 journalled on the main frame, (Fig. 3). A gear 19 on shaft 18 meshes with pinion 20 connected with gear 21 on a shaft 21ᵃ and in mesh with pinion 22 secured on drive shaft 23, journalled on the main frame, which may be provided with a pulley 24 the receive a belt from any suitable source of power, (Figs. 2 and 5). Through the gearing described and the Geneva movement the turret is rotative step by step from the continuously rotating drive shaft 23. At 25 is a chute or guide secured upon the main frame and terminating at its delivery end in position to oppose a series of receivers 5 each time the turret is brought to rest, whereby the attendant may insert the receptacles A in each of the receivers of such series, (Figs. 1 and 5). The machine illustrated has four active or operative positions for the turret and four inactive positions for the same, respectively interposed between the active positions, there being eight series of receivers upon the turret and five receivers in each series.

At a point spaced two spaces of the turret distant from the guide or chute 25 charging devices for the receptacles A are located, indicated generally at the position B, (Fig. 1). Said charging devices comprise a hopper 26 having spaced delivery nozzles 27 corresponding to the positions of the receivers of each series on the turret and so located that when the turret comes to rest the nozzles 27 will be over corresponding receivers. Said nozzles are shown in tubular form and each have a feeder for the material shown in the form of a worm 28 upon a shaft 29, (Figs. 3, 6 and 7), which shafts extend upwardly through the hopper and are journalled at their upper ends in cross bar 30, shown secured upon the main frame by uprights 31. The lower ends of shafts 29 are guided for operation by worms 28 within the nozzles 27. Worm 28 is shown gradually increasing in diameter from the nozzle outwardly, (Fig. 6). Said worms are rotated a given number of turns for each charge of material from the hopper to deliver a predetermined amount into the corresponding receptacles A beneath the hopper. In the example illustrated in Fig. 7 the material $a$ is in powder form, the machine illustrated being adapted to charge receptacles A with talcum powder. The shafts 29 are provided with intermeshing gears 32, (Figs. 1 and 3), one of the shafts 29 being provided with gear 33 in mesh with gear 34 supported by bar 30 and in mesh with gear 35 also supported by said bar, the gear 35 being in mesh with gear 36 secured upon shaft 37 journalled upon said bar and upon the main frame, whereby shafts 29 and worms 28 are equally rotated in unison. Means are provided to rotate the shaft 37 and thereby the worms a definite number of turns for each charging operation as follows:—Gear 38 on shaft 37 is in mesh with gear 39 carried by sleeve 40 loose on shaft 18, which sleeve is provided with a gear 41 in mesh with gear 42 carried by sleeve 43 loose on shaft 23, (Figs 2, 3 and 18). To shaft 23 is secured a clutch member 44 co-operative with a clutch member 45 slidable on sleeve 43 and keyed thereto, (Fig. 18). A spring 46 is shown coiled around sleeve 43 and pressing at one end against clutch member 45 and at the opposite end against stop 47 secured on said sleeve normally tending to force said clutch members into operative engagement for rotating the shaft 37 through the gearing described. An arm 48 is pivotally supported at 49 upon a post 50 and is shown provided with a fork 48ᵃ having pins entering the groove 45ᵃ in clutch member 45, (Figs. 3 and 18), for shifting said clutch member. Arm 48 is movably connected with arm 51 pivotally supported at 52 upon post 53, a pin 54 on arm 48 being operative in slot 55 in arm 51, (Figs. 3 and 4). Arm 51 carries projection 56 co-operative with cam 57 secured upon the Geneva shaft 11, (Figs. 3 and 4). Cam 57 is so arranged that when the turret is being operated said clutch members 44, 45 will be uncoupled so that the worms 28 will be idle. While the turret is at rest with the receptacles A beneath nozzles 27 the cam 57 will operate arms 51, 48 to cause clutch member 45 to engage clutch member 44 to cause rotation of worms 28 to deliver measured charges of material a into several receptacles A beneath the nozzles 27. Cam 57 will operate said arms to cause uncoupling of clutch members 44, 45 to stop the charging of the receptacles sufficiently before the turret makes a step to carry the charged receptacles from beneath the hopper and present a new series of receptacles therebeneath. Cam 57 is shown provided with adjustable cam piece 57$^a$, shown having slots 57$^b$ receiving screws 58 threaded in the cam, whereby said cam piece may be adjusted to lengthen or shorten the effective high part of the cam to control the period of engagement of the clutch members 44, 45 for regulating the quantity of material for each charge, (Fig. 4).

In order to properly position the receptacles A with respect to the delivery nozzles 27 each time the turret comes to rest with the receptacles beneath said nozzles, fingers 59 are operated to push the receptacles snugly in the receivers against the rear portions 5$^d$ thereof, (Figs. 1, 2, 3, 6, 7 and 8). Said fingers are shown provided with hubs 59$^a$ loosely mounted upon shaft 60 journalled in bearings upon the main frame outside of the turret. Said shaft has collars or stops 61 to which coiled springs 62 are attached at 63, the free ends of said springs passing through holes in fingers 59 to resiliently push said fingers against receptacles A, (Figs. 6 and 8). Collars 64 secured on shaft 60 have stop pins 65 co-operative with the corresponding spring 62 to control the operative position of fingers 59. Shaft 60 is provided with an arm 66 pivotally connected by link 67 with arm 68 secured upon shaft 69 journalled in bearings on the main frame, (Figs. 2 and 3). Shaft 69 has arm 70 pivotally connected with rod 71 that is forked at its free end, to be guided by shaft 15, (Figs. 2 and 3). A cam 72 secured on shaft 15 co-operates with rod 71 whereby shaft 69 will be rocked and through arm 68 link 67 will cause rocking of shaft 60 to actuate fingers 59. Since the receptacles are brought to rest spaced below nozzles 27, means are provided to raise the receptacles to receive the charges and to lower the receptacles as follows:—Bar 7 is secured to rods 73 pivotally attached to arms 74 secured on shaft 69, which rods are guided in bearings in table or plate 1$^a$ at 75, (Figs. 2, 3 and 6). The arms 74 are slotted at 76 and receive pins 76$^a$ projecting from rods 73, (Fig. 2), whereby as the arms 74 are rocked the rods 73 will raise and lower bar 7. When the turret comes to rest with receptacles A beneath nozzles 27 rod 71 will be operated by cam 72, whereby shaft 69 will be rocked to cause fingers 59 to be pressed against the receptacles and bar 7 to be raised through the corresponding portion of space 6 of the turret, the said fingers causing the receptacles to be seated snugly against the rear parts 5$^d$ of the receivers and bar 7 raising the receptacles A to receive the nozzles 27, (Fig. 7). At 77 is a guide head for each receptacle slidably mounted upon the corresponding nozzle 27 and having a tapering lower end at 77$^a$ to receive the open ends of the receptacles, (Figs. 3, 5, 6 and 7). A bar 78 carried by the main frame extends along heads 77 and said heads are provided with offset portions or lugs 77$^a$ adapted to rest on bar 78 to retain said heads in position to receive receptacles A. When the receptacles are raised from the turret they will receive the tapering lower ends of heads 77 and the latter will rise along the nozzles 27 for the filling operation, (Fig. 7). When the receptacles have been charged bar 7 descends or retreats, and said heads will descend and aid in lowering the charged receptacles and will be retained by bar 78, (Fig. 6), the fingers 59 also moving away from the receptacles.

After the receptacles have been charged with material a the turret is stepped to bring the receptacles in position to receive covers or tops A$^2$. In the example illustrated the turret makes two steps with the charged receptacles A to present them at the position C, (Fig. 1). At the position C a rotative head 79 is carried by shaft 80 journalled in uprights 1$^c$ supported upon the main frame, (Figs. 2, 11 and 12), which head is provided with a plurality of series of radially disposed recesses or pockets 81 to receive the covers A$^2$ (Figs. 1, 11 and 13). Said recesses are shown located at the ends of arms 82 of said head, four series of said recesses being shown in the corresponding number of said arms equi-distantly spaced. Stops are provided to retain the covers A$^2$ in recesses 81, said stops being shown comprising balls 83 pushed by springs 84 located in bores 85 in the end portions of arms 82, (Figs. 13, 16), the reduced inner ends of said bores retaining the balls in position to be engaged by covers A$^2$ when the latter are inserted in recesses 81. Screws 86 act as abutments for the springs. Means are provided to automatically insert covers A$^2$ in recesses 81 as follows:—A bar 87 is provided with seats 88 for the caps A$^2$, which bar is carried by arms 89 secured to rock shaft 90 journalled upon the uprights 1$^c$, (Figs. 11 and 12). Said shaft is provided with an arm 91 pivotally connected with link 92 that is pivotally connected with arm 94 secured upon shaft 95 journalled upon uprights 1$^c$, said shaft 95 having arm 96, (Figs. 11 and 12). A link or rod 97 is pivotally connected with arm 96 and shown forked to be guided by shaft 18 being provided with pin or projection 98 co-operative with a cam groove 99 in cam member 100 secured upon said shaft. The attendant will place the covers A² upon the seats 88 and cam 99 will operate link 97 to cause the arms 89 to be rocked to push the covers A² into the recesses 81 that are at such time presented in operative relation to seats 88, (Fig. 12), the ball stops 83 temporarily retaining the covers in such recesses.

Means are provided to rotate the head 79 step by step to present the series of recesses 81 in position to receive covers A² and at the same time present a series of said covers within said recesses over the charged receptacles A on the turret, (Fig. 12), as follows:—A slotted member 101 of a Geneva movement is secured to shaft 80 and the arm 102 of said Geneva movement is secured to shaft 103 journaled upon uprights 1ª, (Figs. 1, 5 and 12), said arm having a projection 103 to cooperate with the slots of member 101. The shaft 103ª carries a sprocket wheel 104 receiving chain 105 from sprocket wheel 106 secured on shaft 18, whereby as arm 102 is continuously rotated it will cause step by step rotation of the Geneva member 101 and head 79 so that each time that said head comes to rest a series of its recesses will be in position to receive covers A² from seats 88 while the lowermost series of said recesses will present covers A² over the turret. When the turret comes to rest with a series of charged receptacles beneath the lowermost covers A² in head 79 said receptacles will be raised to receive said covers, and fingers 107 will be operated to seat the receptacles A against the rear parts 5ᵈ of the receivers as follows:—The fingers 107 project from the bar 108 carried by arms 109 secured upon shaft 110 journaled in bearings 111 on the main frame, (Figs. 11 and 12). A coiled spring 112, attached at one end to shaft 110 and at the other end to bearing 111, normally tends to rotate said shaft to cause arms 109 to press fingers 107 against receptacles A to seat them laterally in receivers 5. The arm 113 secured to shaft 110 has a roller 114 co-operative with a cam-like groove 115 of cam member 100, whereby as said cam member is rotated the arm 113 will be rocked and spring 112 will resiliently force fingers 107 toward receptacles A after the turret has come to rest with the receptacles beneath head 79, the cam causing said fingers to move reversely. When the parts are in the last named position the bar 116 is raised to push the receptacles A upwardly to receive the covers A². Said bar is carried by rods 117 that are guided in bores in tables top 1ª and are pivotally connected to links 118 that are pivoted to arms 119 journalled at 120 on brackets 121 hung from said table top, (Figs. 11 and 12). The arms 119 are pivotally connected with straps 122 operated by eccentrics 123 on shaft 18. When the charged receptacles come to rest beneath head 79 the fingers 107 will be operated and eccentrics 123 will cause bar 116 to raise the charged receptacles and push their open ends into the flanges of the corresponding caps A² thereover, (Figs. 12 and 16), to automatically assemble the covers on the receptacles. The bar 116 and rods 117 operate through the adjacent portion of space 6 of the turret, and within the recesses of the receivers. After the receptacles and tops have been assembled they are ejected from the recesses 81 of head 79 by means of ejectors shown in the form of pins 124. Said ejector pins correspond to the recesses 81, and ejector pins for each series of recesses are carried by corresponding transverse bar 125 extending through slots 126 in the arms 82 of the head 79 that communicate with the corresponding recesses 81. Bars 125 have projecting portions or pins 127 at the opposite ends that are adapted to be operated by arms 128 journalled at 129 upon uprights 1ᶜ. Arms 128 are pivotally connected by links 130 to arms 131 secured on shaft 95. Arms 128 are provided with grooves 128ª (Fig. 15) adapted to receive projecting pins 127 of bars 125 for operating the latter. The relation of the parts is such that when the seats 88 are swung outwardly to receive the covers or caps A² the arms 128 will be in position to receive the pins 127 at the opposite ends of bar 125 when said bar with its ejecting pins 124 are located inwardly of the recesses 126, (Fig. 13). After a series of receptacles A have been raised by bar 116 to receive covers A², said bar 116 will descend and arms 128 will be rocked in the direction of the arrow thereon, (Fig. 12), whereby the ejector pins 124 will push the covers A² to eject the latter from recesses 81, and arms 89 will cause covers A² to be inserted in a series of recesses 81 projecting laterally to receive said covers as in dotted lines in Fig. 12. Arms 89 will next move outwardly and arms 128 will be tilted to raise their grooves 128ª to pin receiving position, and thereupon the Geneva members 101, 102 will cause head 79 to rotate a step to bring the last covers A² inserted in recesses 81 over the turret and to carry the last emptied recesses 81 away, the pins 127 that have each been in grooves 128ª passing therefrom, and the pins 127 corresponding to the recesses 81 containing the covers A² entering said grooves 128ª, when the head 79 comes to rest. The operation as described occurs each time the turret is brought to rest with a series of charged receptacles beneath head 79, so that with each step of the turret and said head a series of receptacles are capped.

After the covers or caps have been placed upon the receptacles, as last stated, the turret carries the completed receptacles and comes to rest opposite a chute or guideway 132 carried by the main frame to receive said receptacles discharged at the position D, (Figs. 1, 2 and 19). At said position are a series of discharge fingers 133 depending from bar 134, which bar is secured to rods 135 slidably supported in guides 136 carried by uprights 137 secured upon the main frame. The discharge fingers 133 are spaced in position to travel through the rear spaces 5$^e$ between the members 5$^a$, 5$^b$ of the receivers, and transversely through the receivers to discharge the receptacles therefrom into the chute or guideway 132 when bar 134 is moved outwardly. Bar 134 is pivotally connected with links 138 that are pivotally connected with arms 139 secured to shaft 140 journalled in bearings in uprights 137. Arm 141 extending from shaft 140 is pivotally connected to rod 142 that is guided by shaft 15 and is co-operative with cam 143 on said shaft, (Figs. 1, 2 and 5). As said cam is rotated the discharge fingers 133 will be reciprocated, the arrangement being such that as the turret is rotated said fingers will be in position inwardly behind the receivers, and when said turret is brought to rest said discharge fingers will be moved outwardly through the receivers to engage and discharge the completed receptacles from the receivers, said fingers then returning through the receivers before the turret makes its next step.

The operation may be described as follows:—

The hopper being charged with material $a$, one operator will insert the receptacles A in the several series of receivers as the turret is stepped around, and another operator will apply the covers or caps A$^2$ on the seats 88 for the series of receivers. As the turret is stepped around and comes to rest with a series of receptacles beneath the hopper the receptacles will be raised to nozzles 27, the clutch member 45 will be operated to engage clutch member 44, and worms 28 will be rotated to cause the charges to be inserted in the receptacles. When the receptacles have received the charges the clutch member 45 will be moved out of engagement with member 44, the receptacles will be lowered and the turret will be stepped around. When the charged receptacles are brought to rest by the turret beneath head 79 the bar 116 will rise to insert the receptacles in covers A$^2$ within recesses 81, bar 87 will be operated to insert covers A$^2$ in the waiting series of recesses 81, arms 128 will be operated to cause bar 125 to descend, the ejectors 124 will eject the covers from said recesses, and bar 116 will descend so that the covered receptacles will rest upon the turret. When the turret brings such receptacles to rest opposite the discharge fingers 133 the latter will be advanced to discharge the completed receptacles into the guideway 132. All of the foregoing steps will occur in such timed relation that while the turret is at rest the various operations are being performed of charging, capping and discharging different series of receptacles with the result that each time the turret comes to rest a series of completed receptacles will be discharged therefrom. The positions of rest of the receptacles between the positions of operation are for convenience of construction and location of the various parts, but do not affect the speed with which the completed receptacles are discharged since that is controlled by the step by step timing of the turret.

The turret having the receivers and the charging and discharging devices may be used without the devices for applying the covers on the receptacles in case it be desired to charge receptacles without applying covers thereon in the machine.

The details of construction set forth as well as the relative arrangement of parts set forth may be varied, within the scope of the appended claims, without departing from the spirit of the invention.

What we claim and desire to secure by Letters Patent is:

1. The combination of a turret having spaced receivers to support receptacles and having an annularly disposed space communicating with the receivers, charge delivering devices, means operable through said space to move the receptacles toward the charge delivering devices and to retreat, and means to apply covers upon the charged receptacles.

2. The combination of a turret having spaced receivers to support receptacles and having an annularly disposed space communicating with the receivers, charge delevering devices comprising a hopper having nozzles provided with guiding means for the receptacles, means to propel predetermined charges of goods through the nozzles into the receptacles, means operable through the spaces of the turret to move the receptacles toward the nozzles and retreat, and means to apply covers upon the charged receptacles.

3. The combination of a turret having spaced receivers to support receptacles and having an annularly disposed space communicating with the receivers, charge delivering devices comprising a hopper having nozzles provided with guiding means for the receptacles, means to propel predetermined charges of goods through the nozzles into the receptacles, heads slidable on the nozzles and co-operative with the receptacles, means to retain the heads in receptacle receiving position, means operable through said space of the turret to move the receptacles toward the nozzles and retreat to permit the receptacles to move away, means to supply covers for the receptacles, and means operable through said space of the turret to apply the charged receptacles to the covers.

4. The combination of a turret having spaced receivers to support receptacles and having an annularly disposed space communicating with the receivers, the receivers having recesses opposing said space, a bar operable in said space and recesses to move the receptacles in the receivers, means to operate said bar, charge delivering devices over the receivers to charge the receptacles, means to operate the turret to present receivers successively opposite the charge delivering devices, means to operate the charge delivering devices when the receiver is at rest, means to supply covers for the receptacles, and means operable through said space of the turret to apply the charged receptacles to the covers.

5. The combination of a turret having receivers open at the sides and ends for receptacles, means to rotate the turret step by step, devices operable against the receptacles to seat them in the receivers, charge delivering devices over the receivers, means to operate the turret step by step, means to move the receptacles to and retreat them from the charge delivering devices, and means to operate the charge delivering devices when the turret is at rest.

6. The combination of a support having receivers for receptacles and provided with a space communicating with the receptacles, means to operate said support step by step, a bar operable through said space to move the receptacles in the receivers, rods carrying said bar, fingers opposing the receivers in charging position, means to operate said bar and said fingers to retain the latter against the receptacles while the bar moves the receptacles in the receivers, and charge delivery devices over the receivers to charge the receptacles when moved by the bar to the charge delivering devices.

7. The combination of a turret having a series of spaced receivers for receptacles, the turret having an annular space, means to operate the turret step by step, charge delivering devices having means to discharge predetermined quantities of goods into the receptacles in the receivers, means operative in said space of the turret to move the receptacles to and from said devices, and means to actuate the charge delivering devices when the turret is at rest.

8. The combination of a support having receivers for receptacles, said receivers having open tops and open opposing sides, charging means to charge the receptacles, means to apply covers to the charged receptacles, means to operate said support step by step, discharging means adapted to pass transversely through the receivers to discharge the receptacles therefrom, and means to operate said discharging means when the support is at rest.

9. The combination of a support having receivers for receptacles, said receivers having open tops and open opposing sides, charging means to charge the receptacles, means to apply covers to the charged receptacles, means to operate said support step by step, discharge fingers to pass through the receivers to discharge the receptacles therefrom, a bar carrying said fingers, means slidably supporting the bar, and means to operate said bar and fingers when the support is at rest.

10. The combination of a rotative turret having spaced series of receivers, said receivers being open on the top and on the opposite sides, charging devices over the turret, means to operate the turret step by step, means to operate the charging devices when the turret is at rest, discharge fingers adapted to pass through the receivers to discharge the receptacles therefrom, a bar carrying said fingers, means movably supporting the bar, and means to move the bar and fingers to discharge the receptacles when the turret is at rest.

Signed at New York, county of New York and State of New York, this 17th day of February, 1920.

ERNEST D. ANDERSON.
CARL BECKMANN.